United States Patent
Qiu et al.

(10) Patent No.: US 11,415,232 B2
(45) Date of Patent: Aug. 16, 2022

(54) MANUFACTURING METHOD FOR PROPORTIONAL VALVE BODY

(71) Applicant: A. O. SMITH CORPORATION, Milwaukee, WI (US)

(72) Inventors: Bu Qiu, Nanjing (CN); Dayan Bi, Nanjing (CN); Wei Jiang, Nanjing (CN)

(73) Assignee: A. O. SMITH CORPORATION, Milwaukee, WI (US)

(*) Notice: Subject to any disclaimer, the term of this patent is extended or adjusted under 35 U.S.C. 154(b) by 0 days.

(21) Appl. No.: 17/108,564

(22) Filed: Dec. 1, 2020

(65) Prior Publication Data

US 2021/0080015 A1    Mar. 18, 2021

Related U.S. Application Data

(63) Continuation of application No. 15/551,538, filed as application No. PCT/CN2016/073511 on Feb. 4, 2016, now abandoned.

(30) Foreign Application Priority Data

Feb. 16, 2015 (CN) .......................... 201510084656.0

(51) Int. Cl.
*F16K 27/04* (2006.01)
*F16K 31/08* (2006.01)
(Continued)

(52) U.S. Cl.
CPC ............ *F16K 11/0712* (2013.01); *F16K 3/24* (2013.01); *F16K 27/041* (2013.01);
(Continued)

(58) Field of Classification Search
CPC ..... Y10T 137/49405; Y10T 137/49412; Y10T 137/49416; Y10T 137/87885;
(Continued)

(56) References Cited

U.S. PATENT DOCUMENTS 2,496,176 A ‡ 1/1950 Powers ................... F16K 27/02
                                                                    251/214
2,688,462 A ‡ 9/1954 Barbehenn .............. F16K 27/02
                                                                    251/225
(Continued)

FOREIGN PATENT DOCUMENTS

CN        2871987        ‡ 2/2007
CN        2871987 Y      2/2007
(Continued)

OTHER PUBLICATIONS

Canadian Patent Office Action and Search Report for Application No. 2,973,608 dated May 23, 2019 (3 pages).‡

(Continued)

*Primary Examiner* — Hailey K. Do
(74) *Attorney, Agent, or Firm* — Michael Best & Friedrich LLP

(57) ABSTRACT

The present disclosure discloses a proportional valve body, a proportional valve and a manufacturing method for a proportional valve body. The proportional valve body comprises a body extending in an axial direction, the body being provided with a first cavity and a second cavity penetrating therethrough in the axial direction and isolated from each other; the body being further provided with a first through hole penetrating through an outer wall of the body, the first hole being communicated with the first cavity and isolated from the second cavity. In the present disclosure, the first cavity and the second cavity of the proportional valve body penetrate through the body in the axial direction, thus the general structure of the proportional valve body can be obtained by means of extrusion molding. Extrusion molding has the advantages of easy operation, high productivity, and high utilization ratio of raw materials. And the proportional (Continued)

valve body obtained by means of extrusion molding has favorable structural and mechanical properties.

20 Claims, 8 Drawing Sheets

(51) Int. Cl.
*F16K 31/06* (2006.01)
*F16K 11/07* (2006.01)
*F16K 3/24* (2006.01)

(52) U.S. Cl.
CPC ........ *F16K 27/048* (2013.01); *F16K 31/0668* (2013.01); *F16K 31/0675* (2013.01); *F16K 31/082* (2013.01)

(58) Field of Classification Search
CPC ............. Y10T 29/494; Y10T 29/49405; Y10T 29/49409; Y10T 29/49412; Y10T 29/49416; Y10T 29/49417; Y10T 29/49419; Y10T 29/49426; Y10T 29/49423; F16K 27/02; F16K 27/0236; F16K 27/029; F16K 27/04; F16K 27/041; F16K 27/048; F16K 27/102; F16K 3/24; F16K 3/22; F16K 31/06; F16K 31/08; F16K 31/082; F16K 31/126; F16K 31/1266; F16K 31/365
See application file for complete search history.

(56) References Cited

U.S. PATENT DOCUMENTS

| | | | | |
|---|---|---|---|---|
| 2,898,079 A ‡ | 8/1959 | Rittenhouse | .......... | F16K 31/365 251/30.02 |
| 4,353,290 A * | 10/1982 | Hoffman | ................. | F16H 61/16 137/596.15 |
| 4,570,602 A ‡ | 2/1986 | Atkins | ................. | F02M 55/004 123/456 |
| 5,638,676 A * | 6/1997 | Muller | .................. | F15B 15/202 60/407 |
| 5,829,425 A ‡ | 11/1998 | Woods | .................... | F23K 5/005 126/39 E |
| 6,220,569 B1 ‡ | 4/2001 | Kelly | ...................... | F16K 31/06 251/129.08 |
| 6,302,149 B1 ‡ | 10/2001 | Sato | .................... | F15B 13/0817 137/269 |
| 6,776,395 B1 ‡ | 8/2004 | Meier | ..................... | F16F 15/08 251/36 |
| 7,204,273 B1 ‡ | 4/2007 | Zub | ..................... | F15B 13/0814 137/884 |
| 2001/0022191 A1 ‡ | 9/2001 | Bogdanowicz | ..... | F15B 13/0814 137/271 |
| 2003/0116734 A1* | 6/2003 | Casar | .................. | F16K 27/0254 251/69 |
| 2003/0155025 A1 ‡ | 8/2003 | Camozzi | ............. | F15B 13/0402 137/884 |
| 2004/0187920 A1 ‡ | 9/2004 | Schmidt | ................ | F02D 9/1065 137/15.25 |
| 2005/0072481 A1 ‡ | 4/2005 | Hanada | ................. | F16K 27/003 137/884 |
| 2006/0283509 A1 ‡ | 12/2006 | Narita | ................. | F15B 13/0814 137/596.16 |
| 2007/0164249 A1* | 7/2007 | Willers | ................. | B23P 15/001 251/366 |
| 2007/0181842 A1 ‡ | 8/2007 | Igarashi | ................ | F16K 41/103 251/366 |
| 2009/0126812 A1 ‡ | 5/2009 | Bogdanowicz | ..... | F15B 13/0814 137/637 |
| 2011/0168284 A1 ‡ | 7/2011 | Whitford | .............. | F23L 11/005 137/613 |
| 2012/0241023 A1 ‡ | 9/2012 | Ikeda | ........................ | F16K 1/34 137/487 |
| 2016/0069475 A1 ‡ | 3/2016 | Hein | ................... | F16K 37/0075 73/46 |
| 2016/0312907 A1 ‡ | 10/2016 | Mierendorf | ......... | F16K 27/0263 |

FOREIGN PATENT DOCUMENTS

| | | | | |
|---|---|---|---|---|
| CN | 2934803 | ‡ | 8/2007 | |
| CN | 2934803 Y | | 8/2007 | |
| CN | 202091604 | ‡ | 12/2011 | |
| CN | 202091604 U | | 12/2011 | |
| CN | 203335877 | ‡ | 12/2013 | |
| CN | 203335877 U | | 12/2013 | |
| CN | 203395279 | ‡ | 1/2014 | |
| CN | 203395279 U | | 1/2014 | |
| CN | 103878546 | ‡ | 6/2014 | |
| CN | 103878546 A | | 6/2014 | |
| CN | 104329488 | ‡ | 2/2015 | |
| CN | 104329488 A | | 2/2015 | |
| CN | 204477422 | ‡ | 7/2015 | |
| CN | 204477422 U | | 7/2015 | |
| DE | 2527021 A1 | | 12/1976 | |
| DE | 2527021 A1 | ‡ | 12/1976 | ........... F16K 27/102 |
| FR | 1262643 A | ‡ | 6/1961 | ............ F16K 41/10 |
| FR | 1262643 A | | 6/1961 | |
| GB | 1279199 A | ‡ | 6/1972 | ............ F16K 24/06 |
| GB | 1279199 A | | 6/1972 | |
| GB | 2079983 | ‡ | 1/1982 | |
| GB | 2079983 A | | 1/1982 | |
| JP | H07190237 | ‡ | 7/1995 | |
| JP | H07190237 A | | 7/1995 | |
| WO | 2016131391 A1 | | 8/2016 | |
| WO | WO-2016131391 A1 | ‡ | 8/2016 | ......... F16K 31/0675 |

OTHER PUBLICATIONS

Second Office Action from the State Intellectual Property Office of China for Application No. CN2015100846560 dated Sep. 5, 2016 (14 pages).‡
Fourth Office Action from the State Intellectual Property Office of China for Application No. CN2015100846560 dated May 5, 2017 (13 pages).‡
Third Office Action from the State Intellectual Property Office of China for Application No. CN2015100846560 dated Feb. 20, 2017 (11 pages).‡
First Office Action from the State Intellectual Property Office of China for Application No. CN2015100846560 dated May 18, 2016 (17 pages).‡
PCT/CN2016/073511 International Search Report dated Apr. 22, 2016 (2 pages).‡
Canadian Patent Office Action and Search Report for Application No. 2,973,608 dated Aug. 14, 2018 (4 pages).‡

\* cited by examiner
‡ imported from a related application

MANUFACTURING METHOD FOR PROPORTIONAL VALVE BODY

CROSS-REFERENCES TO RELATED APPLICATIONS

This application claims the priority of Chinese Patent Application No. 201510084656.0 filed on Feb. 16, 2015, and the above application is incorporated herein by reference.

TECHNICAL FIELD

The present disclosure relates to a flow rate control device, and in particular, to a proportional valve body, a proportional valve and a manufacturing method for a proportional valve body.

BACKGROUND ART

In the technical field of gas appliances, a proportional valve is usually used for controlling a flow rate of fuel gas, thus controlling a volume of fuel gas entering a gas appliance.

Chinese utility model patent No. 200520115076.5 discloses a proportional valve, comprising a first valve body and a second valve body, wherein the first valve body is provided with an inlet from which fuel gas enters, and the second valve body is provided with an outlet from which fuel gas enters into a combustion system; the first valve body is mounted with a solenoid valve to control on-off of fuel gas, and the second valve body is mounted with a proportional spool to adjust a volume of fuel gas entering into the combustion system.

The second valve body of such structure is die-casted. Die-casting (full name: high pressure die casting) is a casting method that fills a mold cavity with molten alloy under certain conditions and cools molding under a high pressure. One mold can only produce one proportional valve body in a die-casting process. Thus, the manufacturing efficiency of die-casting is low. So how to improve the manufacturing efficiency of the proportional valve body is a technical problem urgently hoped to be solved by a person skilled in the art. In addition, a product obtained using the die-casting technology has the defects of impurities, pores, etc., causing the yield of die-casted products is low.

SUMMARY OF THE DISCLOSURE

Through repeated researches, the inventor finds that the proportional valve body in the prior art can only be die-casted because its internal structure is complex and irregular. In particular, except a cavity of the proportional valve body assembled with a spool, other cavities isn't disposed through the proportional valve body, and the cavity structures are irregular. Thus only complex manufacturing methods such as die-casting can be used for the proportional valve body.

In order to overcome the above defects of the prior art, the technical problem to be solved by the present disclosure is to provide a proportional valve body, a proportional valve and a manufacturing method for a proportional valve body, which increase the manufacturing efficiency of the proportional valve body and the yield.

The specific technical solutions of the present disclosure are as follows:
A proportional valve body comprises a body extending in an axial direction, the body being provided with a first cavity and a second cavity penetrating therethrough in the axial direction and isolated from each other; the body being further provided with a first through hole penetrating through an outer wall of the body, the first hole being communicated with the first cavity and isolated from the second cavity.

Preferably, the proportional valve body further comprises a second through hole penetrating through the outer wall of the body, the second hole being communicated with the second cavity and isolated from the first cavity.

Preferably, the body comprises two ends opposite to each other in the axial direction; a first groove being formed at one end of the body and communicated with the first cavity and the second cavity, respectively.

Preferably, a second groove surrounding the first cavity or the second cavity is formed at the other end of the body.

Preferably, the first through hole is provided on an outer wall at one side of the body, and the second through hole is provided on an outer wall at the other side of the body.

Preferably, the first cavity or the second cavity is located at a center of the body.

Preferably, the body is further provided with a third cavity penetrating therethrough in the axial direction and isolated from the first cavity and the second cavity.

The present disclosure further discloses a proportional valve, comprising:
a proportional valve body comprising a body extending in an axial direction, the body being provided with a first cavity and a second cavity penetrating therethrough in the axial direction and isolated from each other; the body being further provided with a first through hole penetrating through an outer wall of the body, the first hole being communicated with the first cavity and isolated from the second cavity;
a spool assembled to the first cavity or the second cavity; the spool comprising a blocking element provided at one end of the first cavity or the second cavity, an adjusting element connected to the blocking element, and an electromagnet used in cooperation with the adjusting element so as to achieve an adjustment function;
a first sealing element provided at one end of the proportional valve body, and in a sealed connection therewith;
a second sealing element provided at the other end of the proportional valve body, and in a sealed connection therewith; and
a second through hole communicated with the second cavity and isolated from the first cavity.

Preferably, the second through hole is formed on the body and penetrates through the outer wall of the body.

Preferably, the proportional valve further comprises a stop valve having an outlet end; wherein if the spool is assembled to the first cavity, the outlet end of the stop valve is communicated with the first through hole; or, if the spool is assembled to the second cavity, the outlet end of the stop valve is communicated with the second through hole.

Preferably, a fourth cavity is formed by the first sealing element and the proportional valve body, the fourth cavity being communicated with the first cavity and the second cavity, and the blocking element being arranged in the fourth cavity.

Preferably, the first cavity or the second cavity is located at a center of the proportional valve body.

Preferably, the proportional valve body is provided with a third cavity penetrating therethrough in the axial direction and isolated from the first cavity and the second cavity.

Preferably, one end of the body is provided with a first groove, in which the blocking element is arranged.

Preferably, the other end of the body is provided with a second groove, and the adjusting element comprising a membrane provided at the second groove for sealing the first cavity or the second cavity.

Preferably, the second through hole is formed on the first sealing element or the second sealing element.

The present disclosure further discloses a manufacturing method of a proportional valve body, comprising the steps of:

extruding a raw material into a section bar of a predetermined shape extending in an axial direction; the section bar of the predetermined shape having a first cavity and a second cavity penetrating therethrough in the axial direction and isolated from each other;

cutting the section bar of the predetermined shape based on predetermined dimensions;

providing an outer wall of the section bar with a first through hole communicated with the first cavity and isolated from the second cavity.

Preferably, the manufacturing method of the proportional valve body further comprises providing an outer wall of the section bar with a second through hole communicated with the second cavity and isolated from the first cavity.

Preferably, the section bar comprises two ends opposite to each other in the axial direction; a first groove being formed at one end of the section bar, and communicated with the first cavity and the second cavity, respectively.

Preferably, the manufacturing method of the proportional valve body further comprises forming a second groove at the other end of the first cavity or the second cavity of the section bar, for mounting a membrane.

Preferably, the first through hole is provided on an outer wall at one side of the section bar, and the second through hole is provided on an outer wall at the other side of the section bar.

Preferably, the section bar further comprises a third cavity penetrating therethrough in the axial direction and isolated from the first cavity and the second cavity.

The proportional valve body in the present disclosure is of a simple structure and comprises a first cavity and a second cavity penetrating through the body. The proportional valve adopting the proportional valve body comprises a first sealing element and a second sealing element at two ends of the proportional valve body. The first sealing element and the second sealing element seal the proportional valve body, so that the proportional valve has the same function as that in the prior art. Through the above improvement to the structure of the proportional valve body, an overall shape of the proportional valve body in the present disclosure can be obtained by means of extrusion molding. Correspondingly, the manufacturing method of the proportional valve body in the present disclosure can reduce the defects during the manufacturing of the valve body and improve the yield on one hand, while realizing batch manufacturing with saved materials and high manufacturing efficiency on the other hand.

BRIEF DESCRIPTION OF THE DRAWINGS

The accompanying drawings are described herein merely for the purpose of explanation, and not intended to limit the scope disclosed by the present disclosure in any way. In addition, the shapes and proportional dimensions of components in the accompanying drawings are only illustrative for facilitating understanding the present disclosure, rather than specifically defining the shapes and proportional dimensions of components of the present disclosure. Being taught by the present disclosure, a person skilled in the art can implement the present disclosure by selecting various possible shapes and proportional dimensions depending on the specific circumstances.

Figure 1:
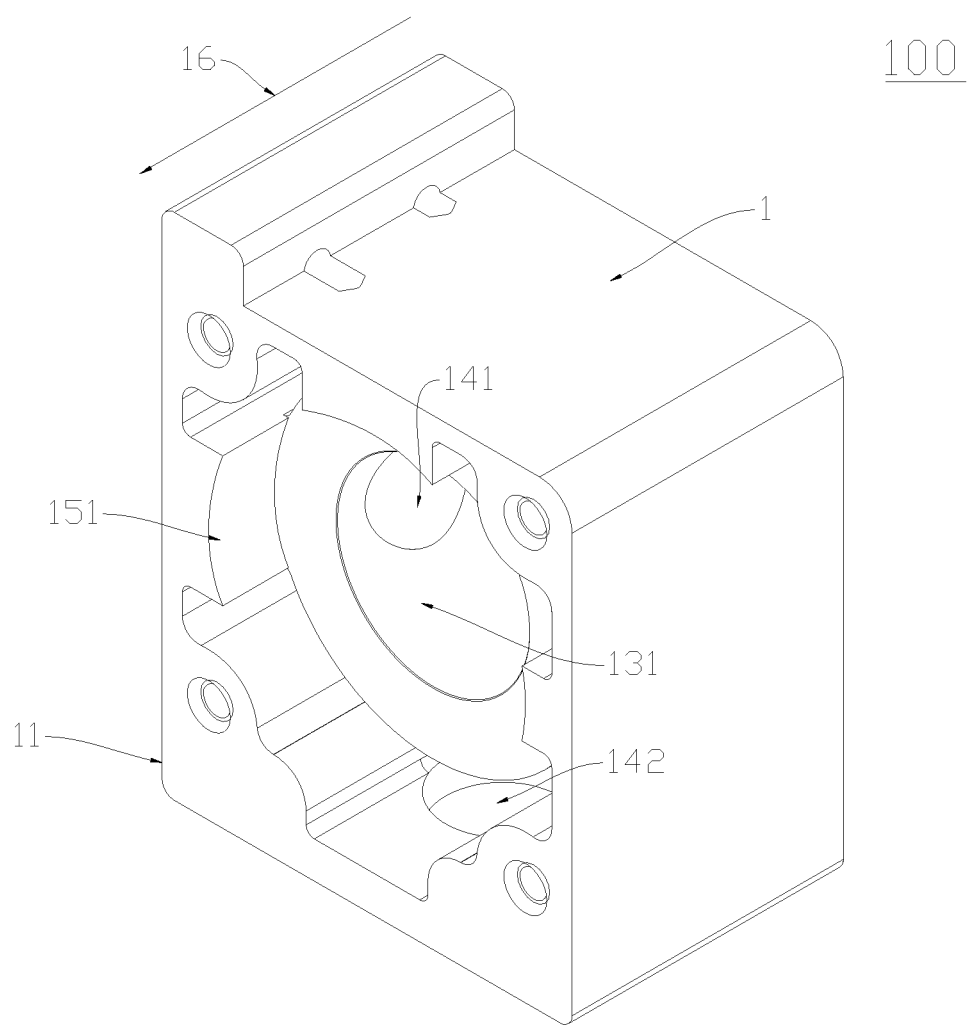
FIG. 1 is a stereo diagrammatic view of a proportional valve body of one specific embodiment of the present disclosure.

List of reference numerals: 100: proportional valve body; 1: body; 11: first end; 12: second end; 131: first cavity; 132: second cavity; 133: third cavity; 141: first through hole; 142: second through hole; 151: first groove; 152: second groove; 16: axial direction; 200: proportional valve; 21: first sealing element; 22: blocking element; 221: magnet; 222: membrane; 223: valve rod; 23: electromagnet; 24: second sealing element; 25: spring; 3: stop valve; 4: section bar.

DETAILED DESCRIPTION OF THE EMBODIMENTS

The details of the present disclosure will be understood more clearly with reference to accompanying drawings and the description of the detailed embodiments of the present disclosure. However, the detailed embodiments of the present disclosure described herein are only used for the purpose of explaining the present disclosure, and should not be understood as limitations to the present disclosure in any way. Being taught by the present disclosure, a person skilled in the art will conceive of any possible modification based on the present disclosure, which shall be regarded as falling within the scope of the present disclosure.

FIGS. 1 to 5 illustrate a proportional valve body 100 of one specific embodiment of the present disclosure. As illustrated in FIGS. 1 to 4, the embodiment discloses a proportional valve body 100, comprising a body 1 extending in an axial direction 16. The body 1 is provided with a first cavity 131 and a second cavity 132 penetrating therethrough in the axial direction 16 and isolated from each other. The body 1 is further provided with a first through hole 141 penetrating through an outer wall of the body 1 and communicated with the first cavity 131. And the first through hole 141 is isolated from the second cavity 132. In the embodiment, the proportional valve body 100 further comprises a second through hole 142 penetrating through the outer wall of the body 1 and communicated with the second cavity 132. And the second through hole 142 is isolated from the first cavity 131.

Specifically, as illustrated in FIG. 1, the direction of arrow is an axial direction 16 of the body 1. In conjunction with FIG. 2, the first cavity 131 of the body 1 is located above the second cavity 132 of the body 1. The first cavity 131 and the second cavity 132 penetrate through the body 1 and are isolated from each other. The first cavity 131 may accommodate a spool 2 of a proportional valve 200. A left sidewall of the body 1 is provided with a first through hole 141 communicated with the first cavity 131 and capable of guiding gas into the body 1. A bottom side of the body 1 is provided with a second through hole 142 communicated with the second cavity 132. The second through hole 142 is capable of discharging gas entering the body 1. Of course, the first through hole 141 and the second through hole 142 may be provided either on different sidewalls of the body 1 as described in the embodiment, or on the same sidewall of the body 1, provided that the isolation between the first through hole 141 and the second cavity 132, the isolation between the second through hole 142 and the first cavity 131, and the isolation between the first through hole 141 and the second through hole 142 can be ensured. In another embodiment, the spool 2 may be provided to pass through the second cavity 132. Correspondingly, the second through hole 142 is used for guiding gas into the body 1, and the first through hole 141 is used for discharging gas.

In another embodiment, the proportional valve body 100 may not comprise the second through hole 142, but discharge gas externally via a first end or a second end of the second cavity 132.

Figure 5:
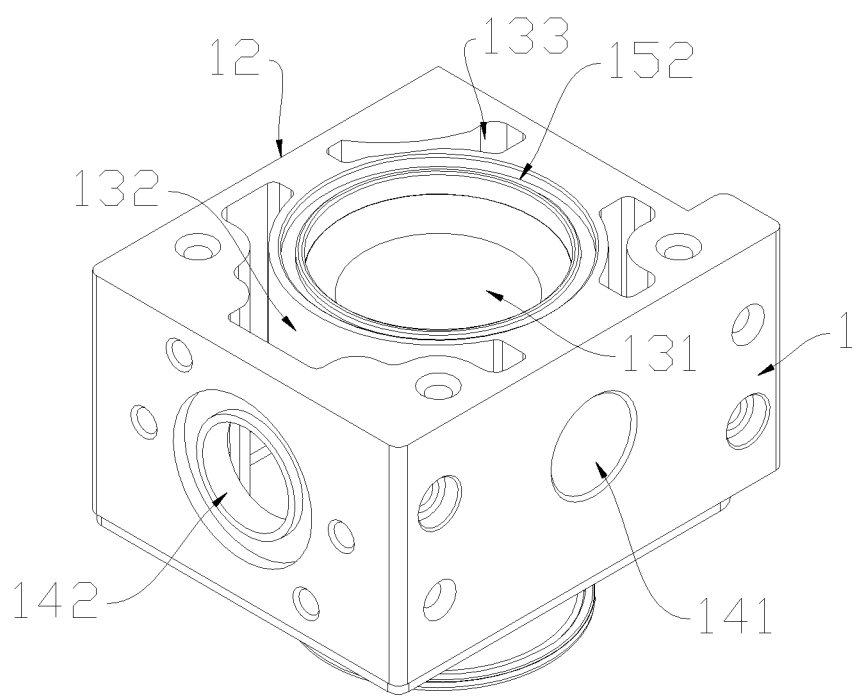
FIG. 5 is another stereo diagrammatic view of the proportional valve body in FIG. 1.

In the embodiment, as illustrated in FIGS. 1 and 5, the body 1 comprises two ends opposite to each other in the axial direction 16. A first groove 151 is formed at the first end 11 of the body 1, and communicated with the first cavity 131 and the second cavity 132, respectively, so as to guide gas entering the first cavity 131 into the second cavity 132 via the first groove 151, in a state where the spool 2 opens the first cavity 131.

In the embodiment, the first cavity 131 and the second cavity 132 of the proportional valve body 100 penetrate through the body 1 in the axial direction 16, thus the general structure of the proportional valve body 100 can be obtained by means of extrusion molding. Extrusion molding has the advantages of easy operation, high productivity, and high utilization ratio of raw materials. And the proportional valve body 100 obtained by means of extrusion molding has favorable structural and mechanical properties.

In a preferred embodiment, as illustrated in FIG. 5, a second groove 152 in the form of a circle surrounding the first cavity 131 is formed at the second end 12 of the body 1. A membrane 222 for the spool 2 may be provided at the second end 12 of the body 1, and may seal the other end of the first cavity 131.

Figure 2:
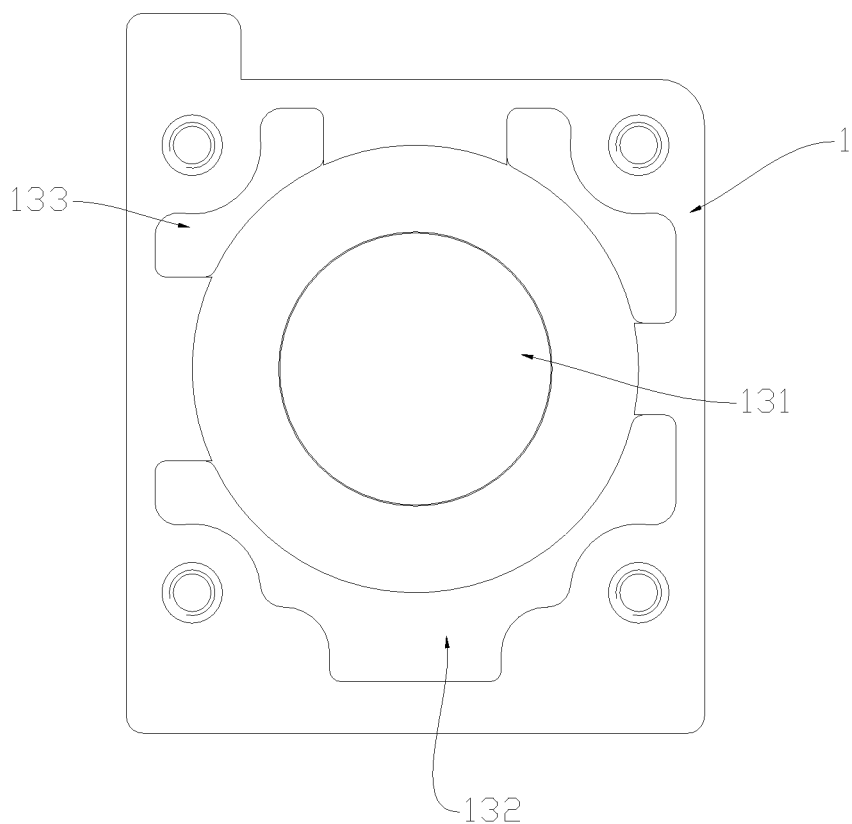
FIG. 2 is a front view of the proportional valve body in FIG. 1.
Figure 3:
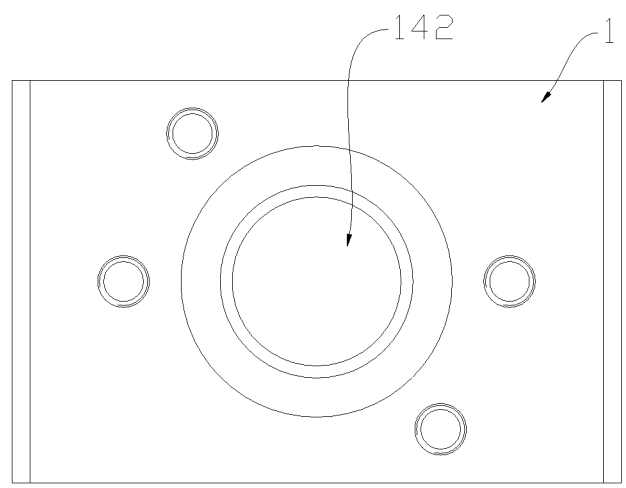
FIG. 3 is a bottom view of the proportional valve body in FIG. 2.
Figure 4:
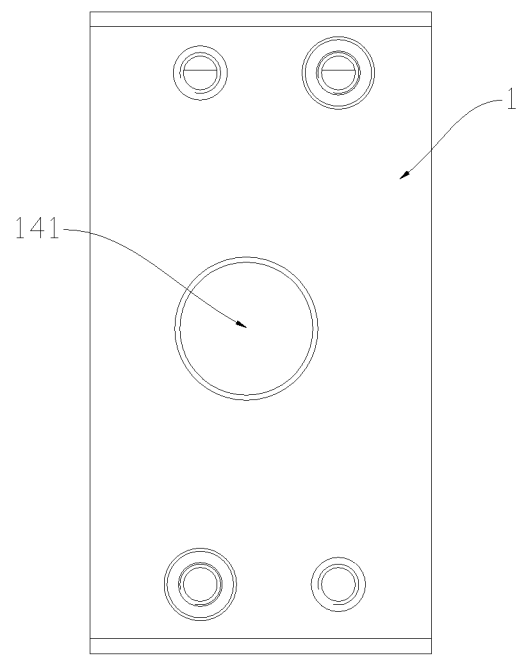
FIG. 4 is a left view of the proportional valve body in FIG. 2.

As illustrated in FIGS. 2 and 5, a third cavity 133 may be provided on the body 1 to penetrate therethrough in the axial direction 16, and isolated from the first cavity 131 and the second cavity 132, so as to ensure that gas entering the body 1 will not sneak into the third cavity 133. In order to improve the strength and stability of the proportional valve body 100, the third cavity 133 is located above the first cavity 131, and substantially symmetrical with the second cavity 132. By providing the third cavity 133 on the proportional valve body 100, the material can be saved.

Figure 6:
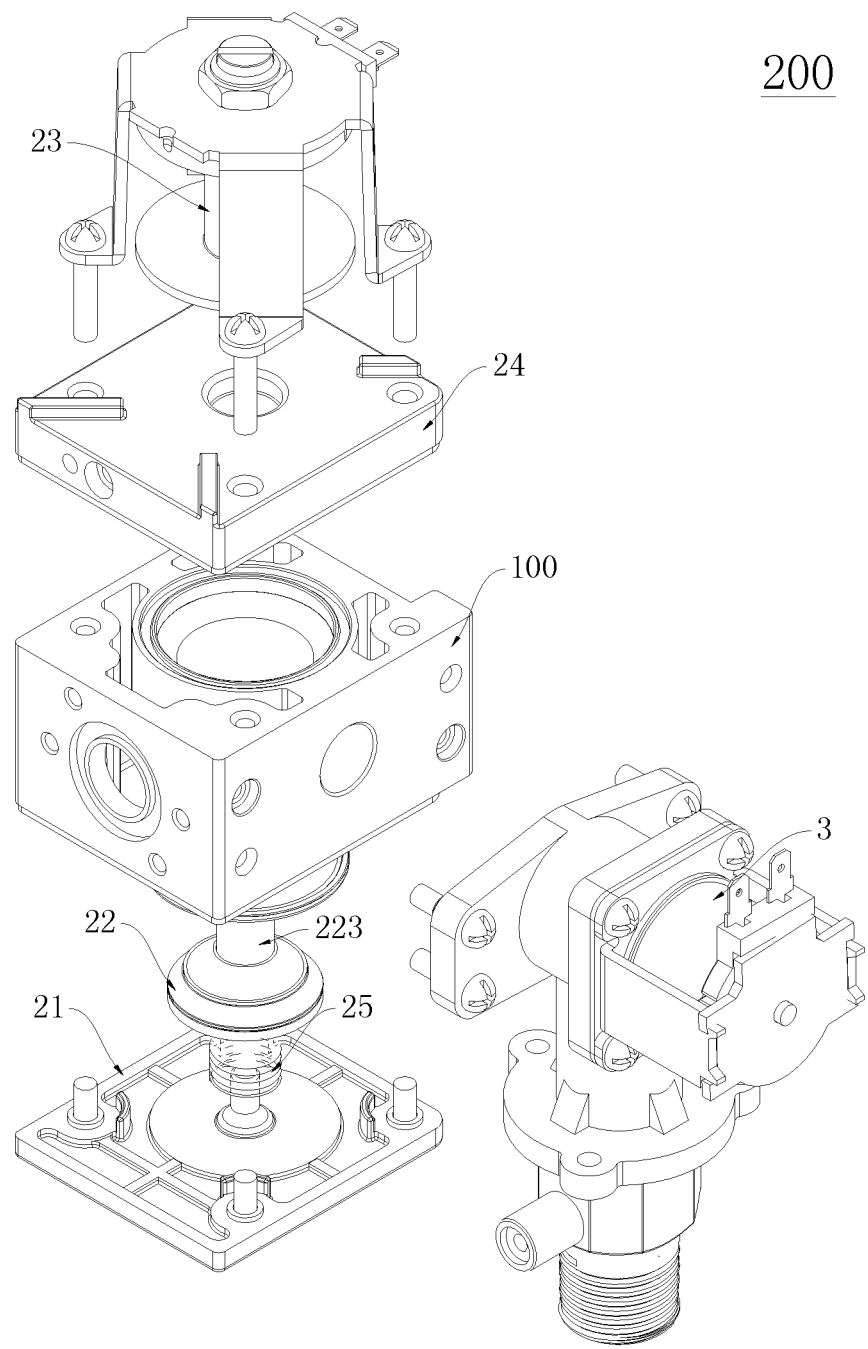
FIG. 6 is an explosion diagrammatic view of a proportional valve of another specific embodiment of the present disclosure.
Figure 7:
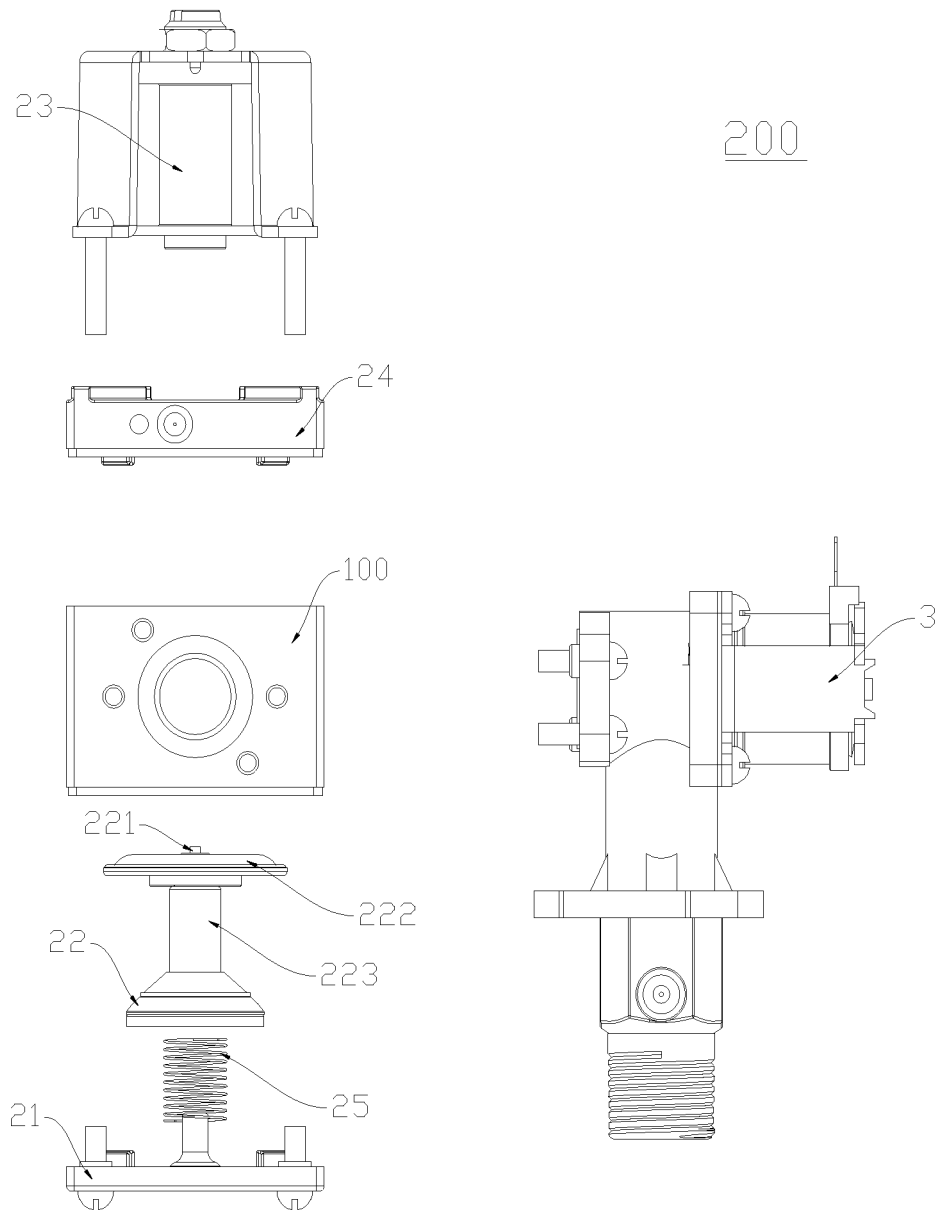
FIG. 7 is another explosion diagrammatic view of the proportional valve in FIG. 6.

FIGS. 6 and 7 illustrate a specific embodiment of the proportional valve 200 in the present disclosure. As illustrated in FIGS. 6 and 7, in the embodiment, the proportional valve 200 comprises a proportional valve body 100, a spool 2, a first sealing element 21 and a second sealing element 24.

The proportional valve body 100 comprises a body 1 extending in an axial direction 16 and having a first end 11 and a second end 12 opposite to each other. The body 1 comprises a first cavity 131 and a second cavity 132 penetrating through the body 1 in the axial direction 16 and isolated from each other. The body 1 is further provided with a first through hole 141 penetrating through an outer wall of the body 1 and communicated with the first cavity 131, and a second through hole 142 penetrating through the outer wall of the body 1 and communicated with the second cavity 132. The first through hole 141 is isolated from the second cavity 132. The second through hole 142 is isolated from the first cavity 131. Please refer to the above description for the specific structure of the proportional valve body 100, which is not repeated herein.

The first sealing element 21 is located at the first end 11 of the body 1 of the proportional valve body 100, and is in a sealed connection with the proportional valve body 100. The second sealing element 24 is located at the second end 12 of the body 1 of the proportional valve body 100, and is in a sealed connection with the proportional valve body 100.

In the embodiment, the spool 2 is assembled to the first cavity 131. The spool 2 comprises a blocking element 22 provided at the first end 11 of the body 1 of the proportional valve body 100, an adjusting element connected to the blocking element 22, and an electromagnet 23 used in cooperation with the adjusting element so as to achieve an adjustment function.

Specifically, as illustrated in FIGS. 6 and 7, the blocking element 22 is provided at an opening of the first cavity 131 facing the first end, and capable of controlling a size of the opening of the first cavity 131 facing the first end in a process where the adjusting element slides relative to the proportional valve body 100, so as to control a flow rate of gas entering the second cavity 132. The adjusting element comprises a magnet 221 provided at the second end of the first cavity 131, and connected to the blocking element 22 via a valve rod 223. The magnet 221 can be used in cooperation with the electromagnet 23. In the embodiment, the electromagnet 23 is an energized coil provided at the second end of the proportional valve body 100. The electromagnet 23 is connected to the proportional valve body 100 via the second sealing element 24. In another embodiment, the electromagnet 23 and the second sealing element 24 may also be integrally configured. A spring 25 for resetting may be further provided between the first sealing element 21 and the blocking element 22, so as to ensure that the blocking element 22 isolates the first cavity 131 from the second cavity 132 in a state where the electromagnet 23 is not energized.

In a preferred embodiment, the second through hole 142 is formed on the first sealing element 21 or the second sealing element 22, so that gas is discharged out of the proportional valve 200 through the first end or the second end of the second cavity 132.

In a preferred embodiment, the first end 11 of the body 1 has a first groove 151 in which the blocking element 22 is arranged. The second end 12 of the body 1 may be provided with a second groove 152 adaptive to the membrane 222, for mounting the membrane 222. The membrane can seal the second end of the first cavity 131.

In the embodiment, the proportional valve 200 may further comprise a stop valve 3 having an outlet end which is communicated with the first through hole 141. The stop valve 3 can cause a gas inlet of the proportional valve 200 to be communicated with or isolated from the gas pipeline. The stop valve 3 may be a solenoid valve. Correspondingly, when the spool 2 is assembled to the second cavity 132, the outlet end of the stop valve 3 is communicated with the second through hole 142.

In order to save materials, the body 1 may be further provided with a third cavity 133 penetrating there through in the axial direction 16 and isolated from the first cavity 131 and the second cavity 132, so as to ensure that gas entering the body 1 will not sneak into the third cavity 133. In order to improve the strength and stability of the proportional valve body 100, the third cavity 133 is located above the first cavity 131, and substantially symmetrical with the second cavity 132.

In a preferred embodiment, a fourth cavity (not illustrated) is formed between the first sealing element 21 and the proportional valve body 100, and communicated with the first cavity 131 and the second cavity 132, respectively. In that case, the body 1 may not have the first groove 151. In a state where the spool 2 opens the first cavity 131, the gas entering the first cavity 131 is guided into the second cavity 132 through the fourth cavity.

The working principle of the proportional valve 200 of the embodiment is as follows: mash gas or other combustible gas enters the first cavity 131 of the proportional valve body 100 from the first through hole 141 of the proportional valve body 100; the adjusting element slides in the axial direction 16 of the proportional valve body 100 under the control of the electromagnet 23, so as to control the flow rate of the mash gas or other combustible gas from the first cavity 131 to the second cavity 132; the mash gas or other combustible gas entering the second cavity 132 flows out of the proportional valve 200 through the second through hole 142 of the proportional valve body 100.

In the embodiment, the first cavity 131 and the second cavity 132 of the proportional valve body 100 penetrate through the body 1 in the axial direction 16, thus the general structure of the proportional valve body 100 can be obtained by means of extrusion molding. Extrusion molding has the advantages of easy operation, high productivity, and high utilization ratio of raw materials. And the proportional valve body 100 obtained by means of extrusion molding has favorable structural and mechanical properties.

Figure 8:
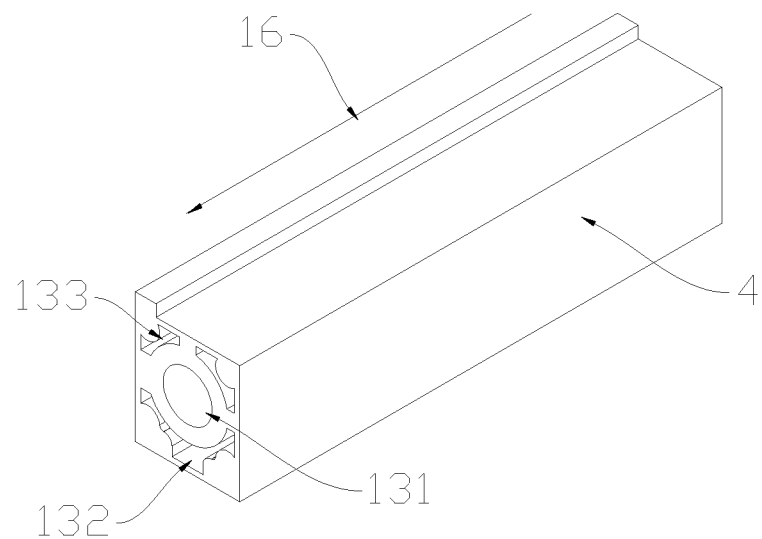
FIG. 8 is a stereo diagrammatic view of a section bar after a first step in a manufacturing method for a proportional valve body of one specific embodiment of the present disclosure.
Figure 9:
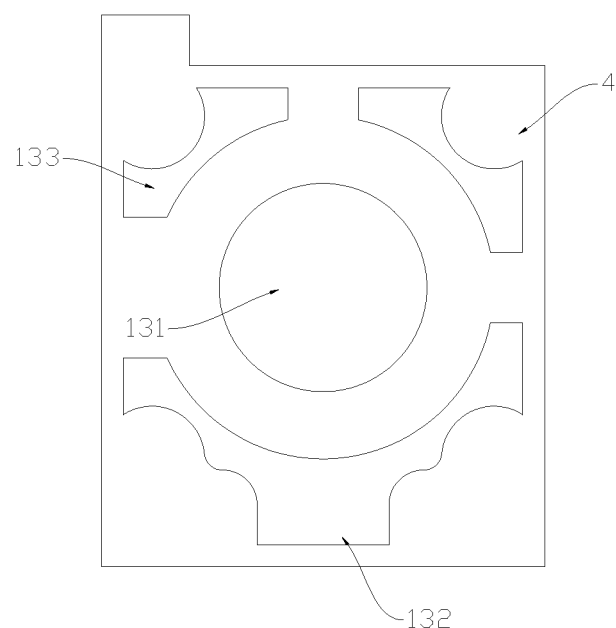
FIG. 9 is a front view of the section bar in FIG. 8.
Figure 10:
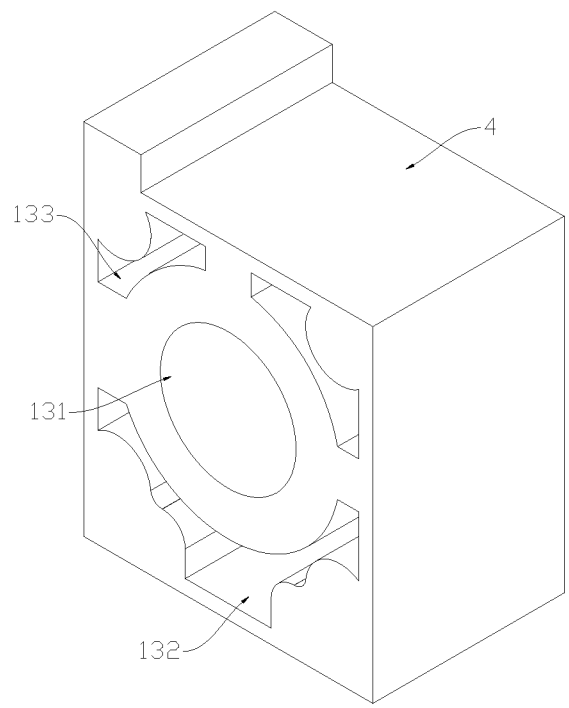
FIG. 10 is a diagrammatic view of the section bar in FIG. 8 after a second step.

A manufacturing method of a proportional valve body 100 in one specific embodiment of the present disclosure comprises the steps of:
(1) extruding a raw material into a section bar 4 of a predetermined shape extending in an axial direction 16; as illustrated in FIGS. 8 and 9, the section bar 4 of the predetermined shape having a first cavity 131 penetrating therethrough in the axial direction 16 and a second cavity 132 isolated from the first cavity 131, wherein the first cavity 131 can be used in cooperation with the spool 2;
(2) as illustrated in FIG. 10, cutting the section bar 4 of the predetermined shape based on predetermined dimensions;
(3) providing an outer wall of the section bar 4 with a first through hole 141 which is communicated with the first cavity 131 and isolated from the second cavity 132;
(4) providing the outer wall of the section bar 4 with a second through hole 142 which is communicated with the second cavity 132 and isolated from the first cavity 131.

In the embodiment, the proportional valve body 100 can be manufactured by extrusion molding. During the extrusion molding, the first cavity 131 and the second cavity 132 which are cooperated with the spool 2 are manufactured simultaneously, and the first through hole 141 and the second through hole 142 are provided based on the first cavity 131 and the second cavity 132. Since the proportional valve body 100 has the cavities penetrating therethrough, it can be obtained by means of extrusion molding, which has the advantages of easy operation, high productivity, high utilization ratio of raw materials, and favorable structural and mechanical properties.

The first through hole 141 and the second through hole 142 may be located on the outer wall of the same side of the section bar 4. In order to facilitate the mounting and reduce the manufacturing difficulty, the first through hole 141 and the second through hole 142 may also be located on the outer walls of different sides of the section bar 4.

In a preferred embodiment, in order to save raw materials, as illustrated in FIGS. 8 and 9, the section bar 4 extrusion-molded in step (1) may further comprise a third cavity 133 penetrating therethrough in the axial direction 16 and isolated from the first cavity 131 and the second cavity 132.

In a preferred embodiment, in conjunction with FIG. 1, the manufacturing method of the proportional valve body 100 may further comprise: providing one end of the section bar 4 with a first groove 151 communicated with the first cavity 131 and the second cavity 132. In conjunction with FIG. 5, a second groove 152 is formed on the other end of the section bar 4 for mounting a membrane 222 that seals the first cavity 131.

In the above embodiments, the spool 2 is arranged in the first cavity 131. Of course, the spool 2 may also be arranged in the second cavity 132. Please refer to the above embodiments for the specific structure, which is not repeated herein.

In the present disclosure, the proportional valve body 100 having a first cavity 131 and a second cavity 132 penetrating therethrough means that the first cavity 131 and the second cavity 132 penetrate through the proportional valve body 100, and either the first cavity 131 or the second cavity 132 has the same shape in each cross section perpendicular to the axial direction 16 of the proportional valve body 100.

The embodiments herein are all described in a progressive manner, and the contents highlighted in each embodiment are distinctions relative to other embodiments, while the same or similar portions of the embodiments can refer to each other.

The above embodiments are merely used for illustrating the technical concept and features of the present disclosure, with a purpose that a person skilled in the art can acquire the content of the present disclosure and accordingly implement the same, rather than limiting the protection scope of the present disclosure. Any equivalent variation or modification made according to the essential spirit of the present disclosure shall fall within the protection scope of the present disclosure.

What is claimed is:
1. A method of manufacturing a proportional valve, the method comprising:
  extruding a section bar in a longitudinal direction, the section bar having a longitudinal axis, a first cavity extending in the longitudinal direction, and a second cavity isolated from the first cavity and extending in the longitudinal direction;
  cutting a desired length from the section bar to define a valve body having first and second opposite ends spaced from each other in the longitudinal direction, such that the first and second cavities extend between the first and second ends of the valve body;
  forming a first through hole in the section bar or the valve body, the first through hole communicating with the first cavity and being isolated from the second cavity;

forming a second through hole in the section bar or the valve body, the second through hole communicating with the second cavity and being isolated from the first cavity; and forming a feature in the valve body to place the first and second cavities in communication with each other;

wherein the extruding step further includes at least one of:
extruding the section bar to include a third cavity extending in the longitudinal direction and isolated from the first and second cavities; and forming the first cavity with a circular cross-section centered on the longitudinal axis and forming the second cavity with an arcuate surface having a radius centered on the longitudinal axis.

2. The method of claim 1, wherein the extruding step includes forming the third cavity and wherein the third cavity includes a third cavity arcuate surface having a radius centered on the longitudinal axis.

3. The method of claim 1, wherein the cutting step includes cutting at least one of the first and second ends perpendicular to the longitudinal axis.

4. The method of claim 1, wherein forming the first through hole and forming the second through hole are performed on different sides of the section bar or valve body.

5. The method of claim 1, wherein forming the first through hole and forming the second through hole are performed on a same side of the section bar or valve body.

6. The method of claim 1, wherein forming the first through hole includes forming the first through hole perpendicular to the longitudinal axis.

7. The method of claim 1, wherein forming a feature includes forming a first groove in the first end of the valve body or forming a fourth cavity in the valve body.

8. The method of claim 1, further comprising forming a groove in the second end of the valve body and mounting a membrane in the groove to seal an end of the first or second cavity.

9. The method of claim 1, further comprising mounting a first sealing element to the first end of the valve body in a sealed connection with the valve body and mounting a second sealing element to the second end of the valve body in a sealed connection with the valve body.

10. The method of claim 9, wherein the second through hole extends through the first sealing element or the second sealing element.

11. A method of manufacturing a proportional valve, the method comprising:
extruding a section bar in a longitudinal direction, the section bar having a longitudinal axis, a first cavity extending in the longitudinal direction, and a second cavity isolated from the first cavity and extending in the longitudinal direction;
cutting a desired length from the section bar to define a valve body having first and second opposite ends spaced from each other in the longitudinal direction, such that the first and second cavities extend between the first and second ends of the valve body;
forming a first through hole in the section bar or the valve body, the first through hole communicating with the first cavity and being isolated from the second cavity;
forming a second through hole in the section bar or the valve body, the second through hole communicating with the second cavity and being isolated from the first cavity, wherein forming the second through hole includes forming the second through hole perpendicular to the first through hole; and forming a feature in the valve body to place the first and second cavities in communication with each other.

12. The method of claim 11, wherein forming the first through hole includes forming the first through hole perpendicular to the longitudinal axis.

13. The method of claim 11, wherein the extruding step further includes at least one of:
extruding the section bar to include a third cavity extending in the longitudinal direction and isolated from the first and second cavities; and
forming the first cavity with a circular cross-section centered on the longitudinal axis and forming the second cavity with an arcuate surface having a radius centered on the longitudinal axis.

14. The method of claim 11, further comprising mounting a first sealing element to the first end of the valve body in a sealed connection with the valve body and mounting a second sealing element to the second end of the valve body in a sealed connection with the valve body.

15. The method of claim 14, wherein the second through hole extends through the first sealing element or the second sealing element.

16. A method of manufacturing a proportional valve, the method comprising:
extruding a section bar in a longitudinal direction, the section bar having a longitudinal axis, a first cavity extending in the longitudinal direction, and a second cavity isolated from the first cavity and extending in the longitudinal direction;
cutting a desired length from the section bar to define a valve body having first and second opposite ends spaced from each other in the longitudinal direction, such that the first and second cavities extend between the first and second ends of the valve body;
forming a first through hole in the section bar or the valve body, the first through hole communicating with the first cavity and being isolated from the second cavity;
forming a second through hole in the section bar or the valve body, the second through hole communicating with the second cavity and being isolated from the first cavity;
forming a feature in the valve body to place the first and second cavities in communication with each other; and
installing a spool in the first cavity or the second cavity for reciprocal movement of the spool parallel to the longitudinal axis.

17. The method of claim 16, wherein the extruding step includes forming the first cavity with a circular cross-section centered on the longitudinal axis and forming the second cavity with an arcuate surface having a radius centered on the longitudinal axis.

18. The method of claim 16, further comprising mounting a first sealing element to the first end of the valve body in a sealed connection with the valve body and mounting a second sealing element to the second end of the valve body in a sealed connection with the valve body.

19. The method of claim 18, wherein the second through hole extends through the first sealing element or the second sealing element.

20. The method of claim 18, further comprising forming a groove in the second end of the valve body and mounting a membrane in the groove to seal an end of the first or second cavity.

* * * * *